US 8,548,784 B2

(12) United States Patent
Dai et al.

(10) Patent No.: US 8,548,784 B2
(45) Date of Patent: Oct. 1, 2013

(54) TAR ESTIMATION (75) Inventors: Jianchun Dai, Houston, TX (US);
Annabelle Kania, Houston, TX (US);
Cengiz Esmersoy, Sugar Land, TX (US); Ling Duan, Katy, TX (US)

(73) Assignee: WesternGeco L.L.C., Houston, TX (US)

(*) Notice: Subject to any disclaimer, the term of this patent is extended or adjusted under 35 U.S.C. 154(b) by 642 days.

(21) Appl. No.: 12/643,360

(22) Filed: Dec. 21, 2009

(65) Prior Publication Data
US 2011/0010143 A1 Jan. 13, 2011

Related U.S. Application Data (60) Provisional application No. 61/225,109, filed on Jul. 13, 2009.

(51) Int. Cl.
*G06G 7/48* (2006.01)

(52) U.S. Cl.
USPC .......................................................... 703/10

(58) Field of Classification Search
USPC .......................................................... 703/10
See application file for complete search history.

(56) References Cited

U.S. PATENT DOCUMENTS

| | | |
|---|---|---|
| 4,964,096 A | 10/1990 | Ruckgaber |
| 5,583,825 A | 12/1996 | Carrazzone et al. |
| 6,970,397 B2 | 11/2005 | Castagna et al. |
| 7,286,939 B2 | 10/2007 | Bachrach et al. |

OTHER PUBLICATIONS

Jin: "Joint Estimation of Porosity and Saturation by Combining a Rock Physics Model and Constrained Pre-stack Seismic Waveform Inversion"; SEG/San Antonio 2007 Annual Meeting; pp. 1957-1961; 2007.*
Fowler et al.; Simultaneous Inversion of the Ladybug prospect and derivation of a lithotype volume; SEG 2000 Expanded Abstracts; pp. 1-3; 2000.*
Gurevich et al.; Viscoelastic modeling of rocks saturated with heavy oil; SEG/San Antonio 2007 Annual Meeting; pp. 1614-1618; 2007.*
Bachrach et al.; Combining rock physics analysis, full waveform prestack inversion and high-resolution seismic interpretation to map lithology units in deep water: A Gulf of Mexico case study; The Leading Edge Apr. 2004; pp. 378-383.*
Perez et al.; Interpreting fracture development from diagenetic mineralogy and thermoelastic contraction modeling; Available online Apr. 9, 2005; Tectonophysics 400 (2005) 179-207.*
Quijada et al.; Characterizing the elastic properties and seismic signature of a heavy oil sand reservoir: Manitou Lake, Saskatchewan.; pp. 1-4; SEG Expanded Abstracts 27, 1789 (2008.*
Warpinski; Elastic and Viscoelastic Calculations of Stresses in Sedimentary Basins; SPF. Formation F.vallllion, Dc-l;tmbcr 1989; pp. 522-530.*
Warpinski et al.; A Viscoelastic Constitutive Model for Determining In-Situ Stress Magnitudes From Anelastic Strain Recovery of Core; SPE Production Engineering, Aug. 1989; pp. 272-289.*

(Continued)

*Primary Examiner* — Hugh Jones (57) ABSTRACT

A method to predict tars and tar sands in petroleum exploration and production in a subsurface volume by building a viscoelastic property model of the volume using rock behavior including tars together with seismic inversion to derive a lithology volume identifying tars.

22 Claims, 5 Drawing Sheets

(56) References Cited

OTHER PUBLICATIONS

Roy et al.; Wide-angle inversion for density: tests for heavy-oil reservoir characterization; 2006; pp. 1660-1664; SEG/New Orleans 2006 Annual Meeting.*

Athy, Density, Porosity and Compaction of Sedimentary Rocks, AAPG, 1930, pp. 124, vol. 14, No. 1.

Dutta, Geopressure Prediction using Seismic Data: Current Status and the Road Ahead, Geophysics, Nov.-Dec. 2002, pp. 2012-2041, vol. 67, No. 6.

Han, et al., Seismic Properties of Heavy Oils-Measure Data, The Leading Edge, Sep. 2008, pp. 1108-1115.

Han, et al., Drilling through Bitumen in the Gulf of Mexico: The Shallower vs. The Deeper, Offshore Technology Conference, May 2008, p. 1.

Ciz, et al., Generalization of Gassmann Equations for Porrous Media Saturated with a Solid Material, Geophysics, Nov.-Dec. 2007, pp. A75-A79, vol. 72, No. 6.

Ramussen, et al., Simultaneous Seismic Inversion, EAGE 66th Conference and Exhibit, Jun. 2004, pp. 1-4.

Rohleder, et al., Challenges of Drilling an Ultra-Deep Well in Deepwater-Spa Prospect, SPE Drilling Conference, Feb. 2003, pp. 1-15.

Romo, et al., Challenges Associated with Subsalt Tar in the Mad Dog Field, SPE Annual Technical Conference and Exhibit, Nov. 2007, pp. 1-15.

Weatherl, Encountering an Unexpected Tar Formation in a Deepwater Gulf of Mexico, SPE Annual Drilling Conference, Feb. 2007, pp. 1-10.

PCT Search Report, dated Feb. 23, 2011, Application No. PCT/US2010/041740.

* cited by examiner

TAR ESTIMATION

CROSS-REFERENCE TO RELATED APPLICATIONS

The present application claims priority under 35 U.S.C. §119(e) to U.S. Provisional Application Ser. No. 61/225,109 filed on Jul. 13, 2009, with the same title and by the same inventors.

STATEMENT REGARDING FEDERALLY SPONSORED RESEARCH OR DEVELOPMENT

Not applicable.

BACKGROUND OF THE INVENTION

1. Field of the Invention

This invention disclosure relates to petroleum exploration and production, a method of tar/tar sand prediction to reduce cost and risk of oil exploration and production.

2. Discussion of Related Art

This section of this document is intended to introduce various aspects of the art that may be related to various aspects of the present invention described and/or claimed below. This section provides background information to facilitate a better understanding of the various aspects of the present invention. As the section's title implies, this is a discussion of related art. That such art is related in no way implies that it is also prior art. The related art may or may not be prior art. It should therefore be understood that the statements in this section of this document are to be read in this light, and not as admissions of prior art.

Tar is a dark brown or black bituminous usually odorous viscous liquid obtained by destructive distillation of organic material. It constitutes the heavy end of hydrocarbon with high content of asphaltenes. In one form, tar and residue oil are found in petroleum reservoirs. These tars often affect oil productivity due to their low permeability. Tars are also found in the porous sands near fault zones or in the vicinity of base of salt. These tars or tar sands are usually pressurized and some of them are mobile once being penetrated by drilling. As the viscous tar fluid flows into the borehole, it may be very difficult to drill through, thus, causing serious problem for drilling and often resulting loss of operation time and money.

Tars are present in many oil reservoirs throughout the world. They are quite common in carbonate reservoirs in the Middle-East, including several of the ten largest reservoirs in the world. Tars are usually—but not always—located at or near present-day oil/water contacts. The tar saturation is commonly unpredictable, at least at the level of detail needed to effectively place injection wells to minimize loss of mobile oil above the tar and to minimize the risk of sidetracking wells to get back above the tar.

To gain full control of these issues, many questions need to be answered: where are the tars (tar sands, tar mats) located? How many are there? What is their horizontal distribution? Do they constitute strong permeability barriers or only partial ones? Can we predict and model tar distribution in a reservoir? Placing horizontal injectors just above tar may require specific real-time geosteering technology.

Numerous cases of tar encounters during petroleum drilling were reported in the deepwater of Gulf of Mexico (Rohleder et al., 2003; Romo et al., 2007; Weatherl, 2007; Gang Han et al., 2008). The tar problem has become a technical challenge and economic risk for the deepwater drilling especially in the Gulf of Mexico. For this reason, extensive studies have been done on the physical property and diagnostic signature of tars/tar sands. However, technique for seismic-based pre-drill (prior to drilling a well) prediction is rare. In fact, some authors even indicate that the "presence of tar cannot be predicted with current seismic technology and there is not a recognized seismic signature" (Romo and others, 2007).

There is an acute need for the industry to find a way to predict the "unpredictable" tar or tar sands on a pre-drilling basis such that drilling through tar can be avoided.

REFERENCES

[1] Athy, L. F., 1930, Density, porosity, and compaction of sedimentary rocks, AAPG Bull., 14(1), 1-24.

[2] Dutta, N. C., 2002, Geopressure prediction using seismic data, Current status and the road ahead, Geophysics, 67, 2012-2041.

[3] De-Hua Han, Jiajin liu, and Michael Batzle, 2008. Seismic properties of heavy oils-measured data, The Leading Edge, September 2008

[4] Han, G., Hunter, K., Osmond, J., et al., 2008. Drilling through Bitumen in Gulf of Mexico: the Shallower vs the Deeper. Paper OTC 19307 presented at the 2008 Offshore Technology Conference, Houston, Tex., 4-8 May.

[5] Radim Ciz and Serge A. Shapiro, 2007. Generalization of Gassmann equations for porous media saturated with a solid material, Geophysics, Vol. 72, No. 6, P. A75-A79

[6] Rasmussen, K. B., Bruun, A., and Pedersen, J. M., 2004. Simultaneous Seismic Inversion, 66th Mtg.: Eur. Assn. Geosci. Eng., P 165.

[7] Rohleder, S. A., Sanders, W. W., Williamson, R. N., et al., 2003. Challenges of Drilling an Ultra-Deep Well in Deepwater—Spa Prospect. Paper SPE/IADC 79810 presented at the SPE/IADC Drilling Conference, Amsterdam, The Netherlands, 19-21 February.

[8] Romo, L. A., Prewett, H., Shaughnessy, J., et al, 2007. Challenges Associated with Subsalt Tar in the Mad Dog Field. Paper SPE 110493, presented at the Annual Technical Conference and Exhibition, Anaheim, Calif., USA, 11-14 November.

[9] Weatherl, M. H., 2007. Encountering an Unexpected Tar Formation in a Deepwater Gulf of Mexico Exploration Well. Paper SPE 105619, presented at the SPE/IADC Drilling Conference, Amsterdam, The Netherlands, 20-22 February.

BRIEF SUMMARY OF THE INVENTION

Methods of predicting the existence of tar/tar sands through the integration of visco-elastic modeling of tar/tar sands, and seismic inversion are disclosed. These methods delineate tar/tar sands, and other rock types in basin-scale through the integration of basin deposition and compaction history analysis, tar modeling, and simultaneous seismic inversion. The methods work in various geological formations.

BRIEF DESCRIPTION OF THE SEVERAL VIEWS OF THE DRAWINGS

A better understanding of the invention can be had when the following detailed description of the preferred embodiments is considered in conjunction with the following drawings, in which.

DETAILED DESCRIPTION OF THE INVENTION

The methods disclosed here use the combination of tar modeling, which describes the visco-elastic properties of the tars and tar-bearing sands in formation, and seismic inversion which describes the similar properties in the formation.

Although the methods are developed from the Gulf of Mexico deep water fields and all examples discussed below are deep water fields, the methods themselves are not limited to the Gulf of Mexico or the deep water fields. It is straight forward to adapt the method to other operation environment, such as on-shore fields or in transition fields.

Figure 1:
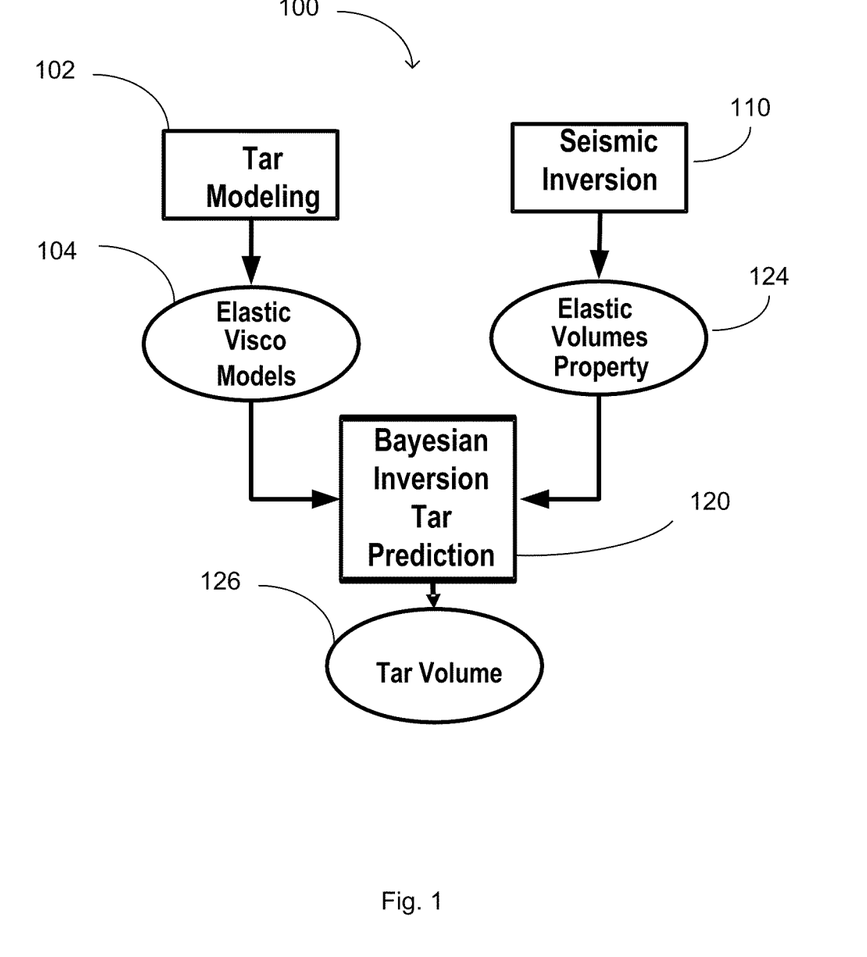
FIG. 1 depicts a conceptual model of the tar prediction in one implementation.
Figure 3:
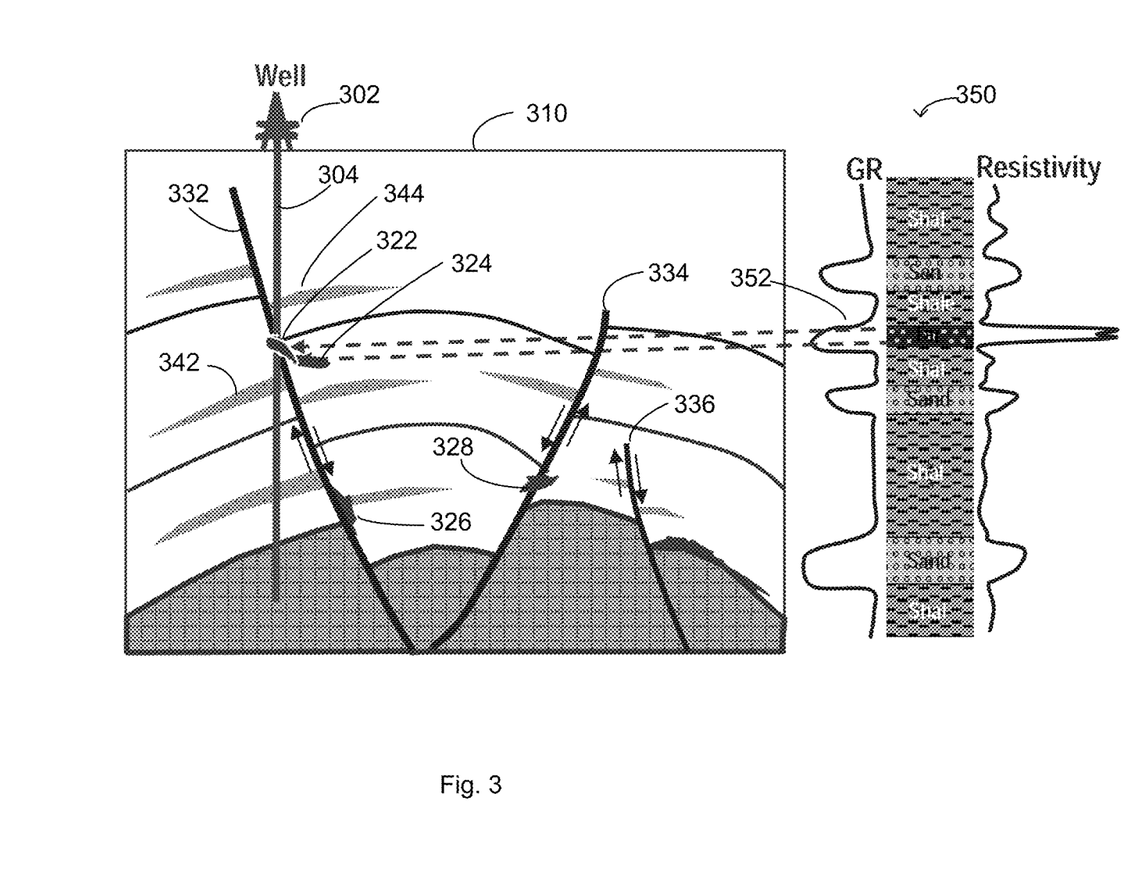
FIG. 3 depicts an example of tar prediction, a section of tar map.

Referring for FIG. 1, in one embodiment, the method 100 includes Seismic Inversion 110, Tar Modeling 102 and Tar Prediction 120. The Tar Modeling 102, which is a viscoelastic property model of the interested subsurface volume, describes the viscoelastic behavior 104 of tars and tar-bearing sands in relation to the tar composition, temperature and pressure conditions, and the background rock property calibrated with measurements if available. The model may also include viscoelastic behavior of other rocks. The Seismic Inversion 110 uses seismic survey data to derive seismic elastic property model 124 of the same subsurface volume where tar prediction is needed and where Tar Modeling 102 is done. The viscoelastic property model 104 and seismic elastic property model 124 each may have many attributes and some of which can be common. Some of the common attributes include acoustic impedance, shear impedance, Poisson's ratio, density, Vp or Vs. From these at least two models, a likelihood probability density function p(d/m) of tar/tar sands and other lithology members is generated based on the modeling result 104. Posterior probability density function p(m/d) is estimated through Bayesian inversion and the maximum a posterior (MAP) rule is applied for tar/tar sands and other lithology definition in the Tar Prediction 120. As a result, the output lithology volume 126 is the lithology definition, including tars, tar sands, and other rock types (shale, sand etc.) with their associated posterior probability. When tars or tar sands are highlighted in this lithology volume, it may be referred to as a tar volume or a tar map. One such result is illustrated in FIG. 3, which is discussed in more details below.

Figure 2:
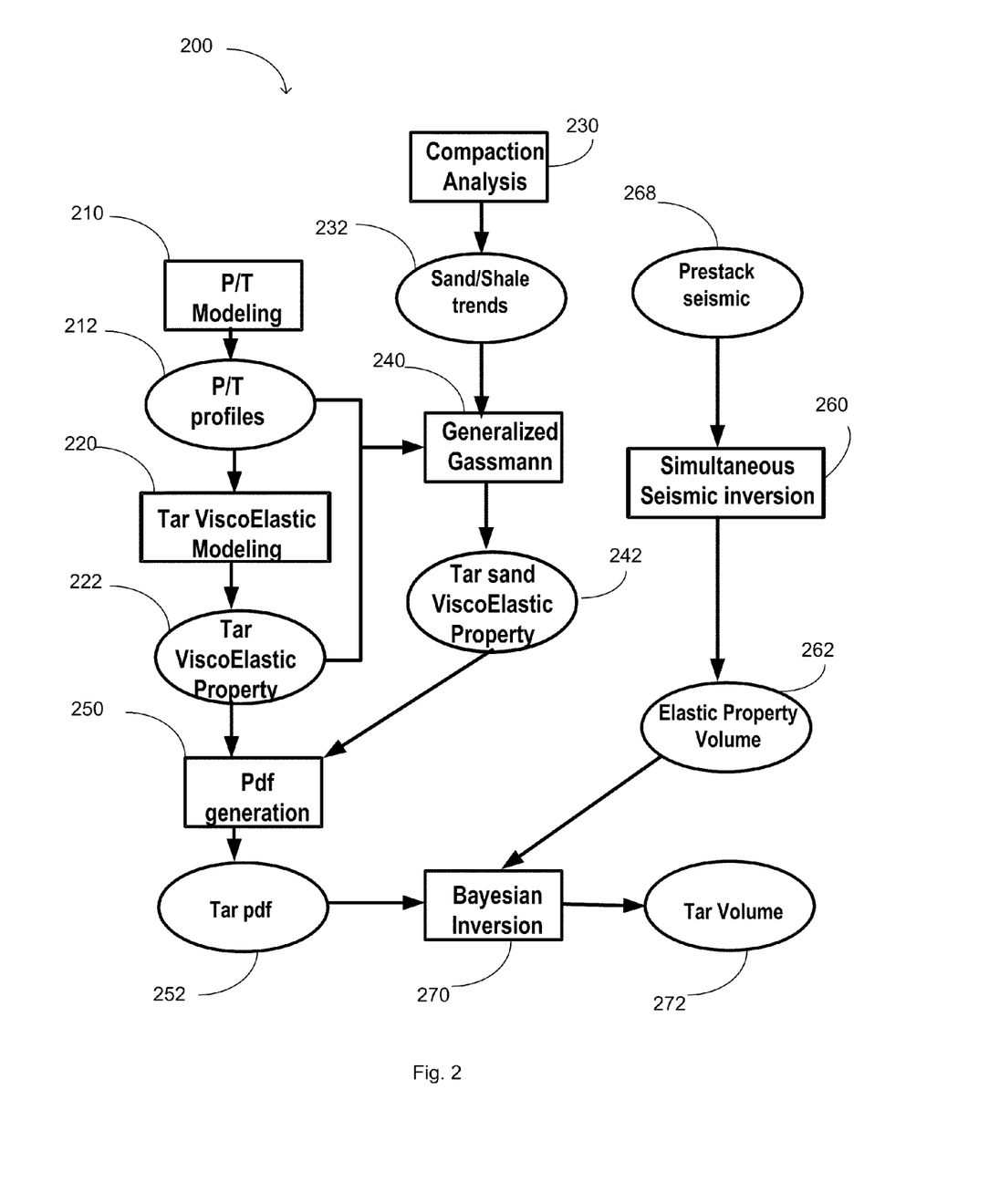
FIG. 2 depicts another flow chart of seismic-based tar estimation used for tar prediction.

In another embodiment, referring to FIG. 2, a method for pre-drill tar prediction through the integration of tar modeling and prestack seismic inversion is used. This method 200 may include some of the 7 major components. A first component 210 P/T Modeling is to model pore pressure, overburden pressure, and formation temperature with burial depth. A second component 220 Tar ViscoElastic Modeling is to model the viscoelastic property of tar as a function of tar composition, temperature and pressure conditions. One simple way of doing this is to adopt the method as described by Han et al. (2008) [4]. A third component 230 Compaction Analysis is to model and construct local lithology trends (porosity, sand/shale trends) based on compaction analysis and reference to basin deposition history. A fourth component 240 is to estimate tar-bearing sands property using the generalized Gassmann equation. An example is shown in Ciz and Shapiro, 2007 [5]. A fifth component 250 is to sample and construct the probability density function (pdf) of tar, or other rock types from the modeling result. A sixth component 260 is to derive seismic elastic property model using simultaneous prestack inversion, for example as discussed in Rasmussen, 2004[6]. This seismic elastic property model contains many elastic attributes, similar to the attributes in the models of tars, tar sands. Finally, a seventh component 270 is to generate a lithology volume, which defines lithology type, including tars, tar sands and other rock types through Bayesian inversion. The MAP estimation is obtained using the likelihood pdf 252 generated from fifth component 250 and the elastic attributes 262 derived from sixth component 260 as input. The end result is a lithology volume 272, including tars, tar sands, and other rock types such as sand or shale, with their corresponding a-posterior probability. The lithology volume can identify various types of rocks and is not limited to tars or tar sands.

Method 200 may assume that tars are either as porous space infill or as homogenous layers. In the former case, the tar is considered as infilling solid, viscous fluid or standard fluid depending on the tar composition and temperature and pressure condition. For the later case, the tar is considered as a homogeneous body and it supports the overburden.

Method 200 may assume that the tar behaves in a similar way as reported on the property of extremely heavy oil (Han at al., 2008 [4]), its effect on bearing rock property can be characterized by the Generalized Gassmann equation (Ciz and Shapiro, 2007 [5]). Method 200 works better if, for example, the properties of tars or tar sands are very different from other rock members, and sizable enough to be resolved from seismic measurements. The resolution of the tar volume is directed related to the resolution of the seismic measurement.

As stated above, the methods of tar estimation using seismic information may include some of the 7 major components: 210, overburden pressure, and formation temperature with burial depth; 220, viscoelastic modeling for tars; 230, basin-scale lithology trends analysis (e.g., porosity, sand/shale trends) based on compaction analysis; 240, tar-bearing sands property estimation using the generalized Gassmann equation; 250, sampling and constructing the pdf for tar (sands) based on the modeling result; 260, elastic attributes derivation using simultaneous prestack inversion; and 270, tar (sands) estimation using Bayesian inversion. The following describes each of the possible major components.

1. Basin-Scale Temperature and Pore Pressure Estimation:

Formation temperature, $T_z$, is estimated as a function of a reference temperature at seafloor, $T_{ml}$, local geothermal gradient, $T_{grad}$, and the burial depth $\Delta Z$ (below mudline):

$$T_Z = T_{ml} + T_{grad} \Delta Z \tag{1.1}$$

Pore pressure, $P_{z\_pore}$, is estimated assuming hydrostatic pressure:

$$P_{z\_pore} = \int_0^z \rho_{fl}(z) g(z) \, dz + p_0 \tag{1.2}$$

where $\rho_{fl}$ is the pore fluid density, g is the gravity, and $p_0$, is the atmospheric pressure at the sea level.

The overburden pressure, $P_{z\_overburden}$, is estimated using $$P_{z\_overburden} = \int_0^z \rho(z)g(z)dz + p_0 \qquad (1.3)$$

where $\rho$ is the rock bulk density.

These estimations will be calibrated whenever measurements are available. It is noted that there are other ways to estimate these parameters, which is well known to a person with ordinary skills of art in this field.

2. Viscoelastic Modeling for Tars:

The tar modeling may follow the concept as laid out by Han and others (2008) among others. In reference to FIG. 4, the tar (bitumen or extremely heavy oil) 400 may be divided into glassy solid state 410, quasi-solid (viscous) state 420, and liquid state 430 based on glass point (GP) and liquid point (LP) temperatures. The solid state 410 refers to the interval when temperature is lower than the GP. The viscous state 420 refers to the tar when temperature is higher than GP temperature and lower than LP temperature and the liquid state 430 refers to the state when temperature is higher than LP temperature. It is noticed that these characteristic temperatures of a certain tar/bitumen may vary with both measurement frequency and pressure.

Figure 4:
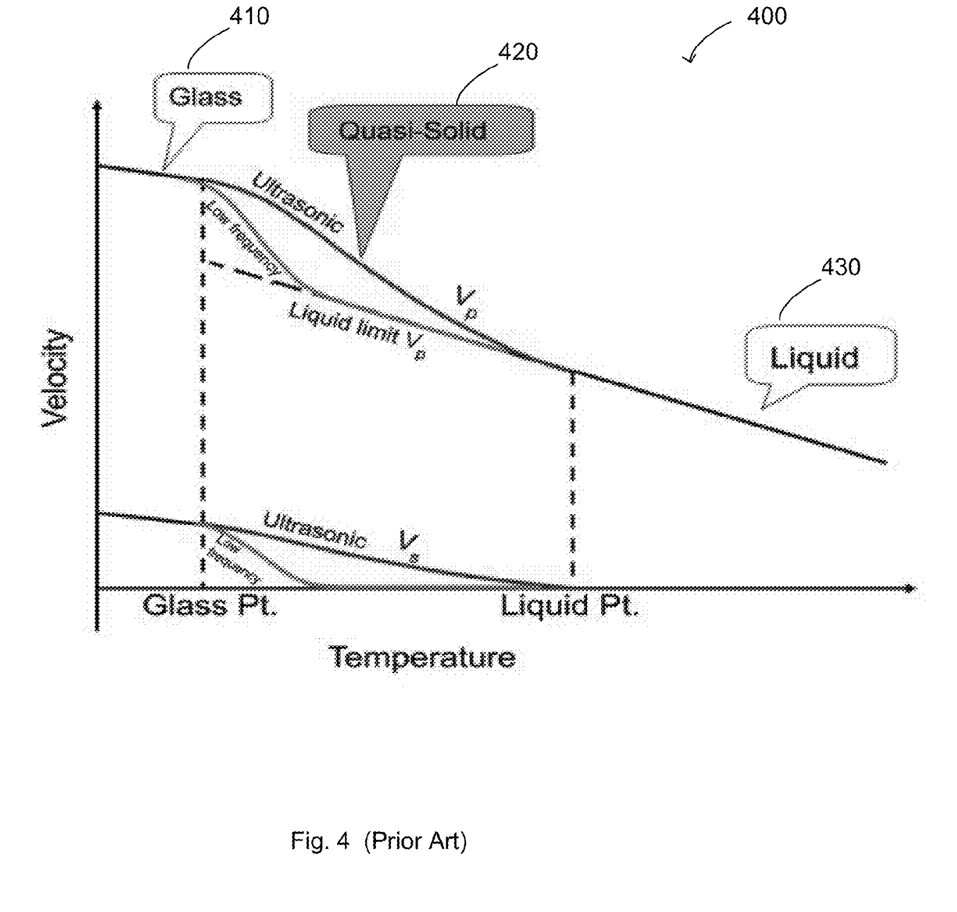
FIG. 4 depicts a P-wave/S-wave velocity plot in terms of temperature, which is used in a tar prediction model.

Liquid State: $T>T_{lP}$ $$V_p \approx V_{p\_lq} + B(T-T_{lp}) \qquad (2.1)$$

$$V_s \approx 0 \qquad (2.2)$$

where Vp and Vs are the P-wave and S-wave velocities, $V_{p\_lq}$ is the Vp of the bitumen at LP temperature, and B is the slope.

Quasi-Solid State: $Tgp<T<T_{lp}$ $$V_p \approx V_{p\_lq} + B(T-T_{lp}) + C(\eta(API,T),f) \qquad (2.3)$$

$$V_s \approx V_s(\eta(API,T),f) \qquad (2.4)$$

where $\eta$ is the viscosity and C is the coefficient for the viscosity term.

Glassy-Solid State: $Tgp<T$

Both Vp and Vs increases quasi-linearly with the decrease of the temperature. When this tar model is used, the determination of the coefficients can be calibrated with measurements when available or cross-checked with other means of estimates. The state and viscoelastic property of a tar with certain composition, API value, temperature and pressure conditions can be estimated accordingly.

3. Compaction Analysis

The subject of compaction has been well studied and there exists multiple methods for constructing the compaction trends of different rock groups. A good review on the subject of compaction can be found in Dutta (2002) [2]. In general, the compaction is defined by trends through the integration of Athy (1930)-type [1] of regression and effective theory modeling (ETM) and is calibrated with available log and seismic information. This is fairly straight forward. This analysis provides the local lithology trends.

4. Tar-Baring Sands Property Estimation

Tar-baring sands property estimation may be done using generalized Gassmann equation (Ciz and Shapiro, 2007 [5]):

$$K_{sat}^{*-1} = K_{dry}^{-1} - \frac{(K_{dry}^{-1} - K_{gr}^{-1})^2}{\phi(K_{if}^{-1} - K_\phi^{-1}) + (K_{dry}^{-1} - K_{gr}^{-1})} \qquad (4.1)$$

$$\mu_{sat}^{*-1} = \mu_{dry}^{-1} - \frac{(\mu_{dry}^{-1} - \mu_{gr}^{-1})^2}{\phi(\mu_{if}^{-1} - \mu_\phi^{-1}) + (\mu_{dry}^{-1} - \mu_{gr}^{-1})} \qquad (4.2)$$

Where $K_{sat}^*$ and a $\mu_{sat}^*$ are solid saturated bulk and shear moduli, $K_{dry}$ and a $\mu_{dry}$ denote drained bulk and shear moduli of the porous frame, $K_{gr}$ and a $\mu_{gr}$ represent bulk and shear moduli of the grain material of the frame $K_\phi$ and a $\mu_\phi$ are bulk and shear moduli related to the pore space of the frame, and $K_{if}$ and a $\mu_{if}$ are the newly defined bulk and shear moduli related to the solid body of the pore infill. Equations 4.1 and 4.2 represent the isotropic Gassmann equations for a solid-saturated porous rock (in this case it is glassy solid). For viscoelastic material filling the pore space:

$$\mu_{if}(\omega) = \frac{\mu_\infty}{\frac{-i\mu_\infty}{\omega\eta}+1} \qquad (4.3)$$

$$V_s = \left(\frac{\mu_{sat}^*}{\rho}\right)^{\frac{1}{2}} \qquad (4.4)$$

Equations (4.1) and (4.2) are used to estimate the bulk and shear moduli assuming glassy solid tar infill the pore space. For viscous sate, equation (4.3) for Maxwell fluid model is used to estimate the shear moduli. Equation (4.4) shows the relation between shear velocity and shear moduli.

For homogeneous porous frame, $K_\phi = K_{gr}$ and $\mu_\phi = \mu_{gr}$. For the liquid state, when $\mu_{if} = 0$, equation (4.1) and (4.2) reduce to standard Gassmann equation.

Combining the results (212, 222, 232) from the first three components (210, 220, 230) via general Gassmann equation (240), a tar sand viscoelastic property model 242 is derived.

5. Tar Pdf Generation

Sampling and generating likelihood pdf for the tar model, p(d|m) 252 is done here. The likelihood pdf includes tar/tar sands, wet-sands, shale, and other rock members based on the modeling results as discussed above 2 through 4, as shown in FIG. 2, where the results include Tar ViscoElastic Property 222, Tar sand ViscoElastic Property 242. This likelihood pdf refers to a particular or combination of multi-attributes, including acoustic impedance, shear impedance/Poisson's ratio, and/or density or their combination. In generating the likelihood p(d|m) of an attribute or combination of attributes (d refers to the attributes), large samples (usually several to tens of millions) are drawn randomly from the corresponding model to ensure the statistical stability of the pdf. The multi-dimensional likelihood pdf 252 is constructed from the sampled data. The pdf 252 may be referred to as Tar pdf, if tar is the main interest.

6. Elastic Property Derivation from Simultaneous Prestack Inversion:

The seismic elastic property model of the volume 262 (i.e., acoustic impedance, shear impedance/Poisson's ratio, and/or density) are derived from simultaneous prestack seismic inversion 260. The resolution of this model is determined by the resolution of the seismic data used. One such inversion is discussed in Rasmussen et al., 2004[6]. Simultaneous inversion is an industry-leading seismic inversion technology for inversion of elastic parameters from prestack seismic data. Preconditioned seismic data are input as multiple angle stacks. Prior models for P-wave velocity Vp, S-wave velocity Vs (or Poisson Ratio Vp/Vs), and density are the a priori models for elastic parameters and form a basis for the objective and the cost functions for inversion. The prior models are usually derived from seismic velocity, interpreted seismic horizons, and available well information. A simulated annealing method may be used to generate and update model parameters. The forward modeling may be done using the linearized Zoeppritz equation based reflection coefficient series convolved with angle-dependent wavelets. The wavelets may vary spatially and temporally for each angle stack. It is a multi-trace inversion method, which uses a global error minimization algorithm and yields a robust inversion result.

7. Tar Mapping: a Bayesian Statistical Approach

The probability of the occurrence of certain rock type including tars and tar sands for a given attribute or combination of attributes (d, which can be acoustic impedance, shear impedance/Poisson's ratio, and/or density or their combination as generated in step 6), P(m|d) is calculated through Bayesian's method as expressed in equation (7.1).

$$p(m|d)=p(m)*p(d|m)/p(d) \qquad (7.1)$$

where P(m), p(d) are the prior probability for a model and the summation of the probability for all the models. The numerator on the right hand side of the equation is the product of the likelihood term and the prior term of a model and the term on the left hand side is the posterior probability. The rock types including tars and tar sands for a given attribute or combination of attributes (d) is defined by the maximum posteriori probability (MAP). In situations where the prior probabilities are not known, a probability equal to 1 divided by the total number of models may be used for the priori probability for all the models.

The rock type for each cube within the volume is determined following the maximum a posteriori (MAP) rule such that the occurrence of tar/tar sands from the output volume indicates the probability for tar/tar sands is the highest among the rest of the rock groups. The same volume also includes other rock types, as shown in the example in FIG. 3. The resulting volume showing the rock type at any location within the volume may be referred to lithology volume. When tar or tar sand is highlighted, it may be referred to as tar volume.

FIG. 3 illustrates a sample tar volume resulting from method 100 or 200. For simplicity, the tar volume 310 shown on the left hand side in FIG. 3 is only a 2D cross-section map of a 3D tar volume of the subsurface structure of interest. Tar map 310 is actually a total lithology map, which can identify all rock types within the volume. Because tar or tar sand is the main interest, only tar or tar sand is pointed out and discussed here. Most other rock types are not shown or discussed. The right hand chart 350 illustrates a well log. The tar sands (e.g. 322) are characterized by low GR and very high resistivity log responses 352 as shown in chart 350. A 3D volume produced from one of the methods indicates the various subsurface rock types, such as shale (342), sand (344) or tar/or tar sands (322, 324, 326 and 328) and several fault lines (e.g. 332, 334 and 336). In this example, tar map 310 clearly captures the tar anomaly 322, which is encountered by the drilling of well 302 at the depth indicated. Tar map 310 resulting from a method also predicts some other anomalies (324, 326 and 328) in the vicinity of the same drilling location and at deeper depth than the encountered tar anomaly 322.

In an actual exploration or production drilling, using the tar map 310, the drilling team could have altered the drilling trajectory 304 to avoid drilling through the tar/tar sands 322 while still drilling through the hydrocarbon depository. If drilling through the tar/tar sands 322 is not avoidable, the drilling team can be prepared with special equipment, material or techniques to minimize the detrimental effects of tars/tar sands. The drilling plan may be switched to this "tar-drilling" mode around the tars or tar sands.

The tar map generated from the above methods can be used for pre-drilling planning to design a well trajectory that avoids locations where tars or tar sands are predicted. The tar map may also be updated during drilling when new data are made available from well log or other measurement while drilling. The updated tar map can further guide the drilling operation. After a well is put into production, the tar map may still be used for applying other remedial methods to minimize the effects of tar on oil production.

Figure 5:
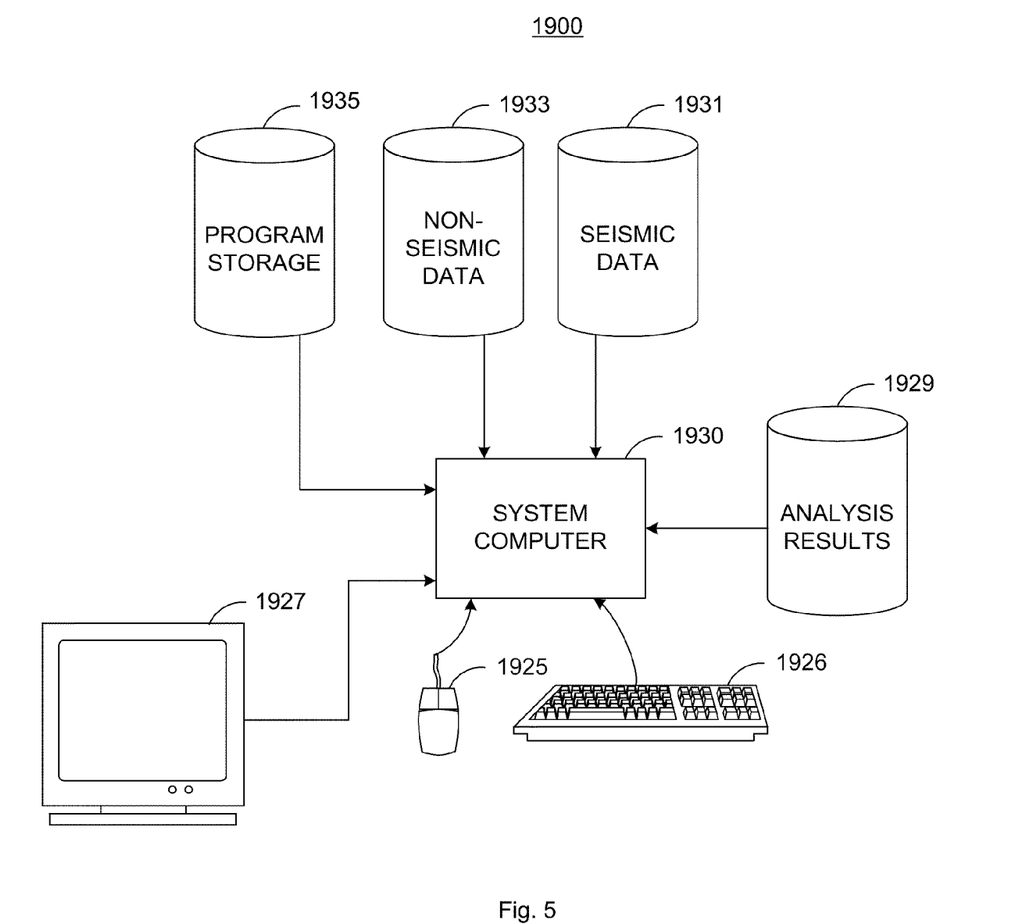
FIG. 5 depicts a processing system executing the tar prediction model.

The methods described above are typically implemented in a computer system 1900, one of which is shown in FIG. 5. The system computer 1930 may be in communication with disk storage devices 1929, 1931, 1933 and 1935, which may be external hard disk storage devices. It is contemplated that disk storage devices 1929, 1931, 1933 and 1935 are conventional hard disk drives, and as such, will be implemented by way of a local area network or by remote access. Of course, while disk storage devices are illustrated as separate devices, a single disk storage device may be used to store any and all of the program instructions, measurement data, and results as desired.

In one implementation, seismic data from the seismic receivers may be stored in disk storage device 1931. Various non-seismic data from different sources may be stored in disk storage device 1933. The system computer 1930 may retrieve the appropriate data from the disk storage devices 1931 or 1933 to process data according to program instructions that correspond to implementations of various techniques described herein. The program instructions may be written in a computer programming language, such as C++, Java and the like. The program instructions may be stored in a computer-readable medium, such as program disk storage device 1935. Such computer-readable media may include computer storage media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the system computer 1930. Combinations of any of the above may also be included within the scope of computer readable media.

In one implementation, the system computer 1930 may present output primarily onto graphics display 1927, or alternatively via printer 1928 (not shown). The system computer 1930 may store the results of the methods described above on disk storage 1929, for later use and further analysis. The keyboard 1926 and the pointing device (e.g., a mouse, trackball, or the like) 1925 may be provided with the system computer 1930 to enable interactive operation.

The system computer 1930 may be located at a data center remote from an exploration field. The system computer 1930 may be in communication with equipment on site to receive data of various measurements. The system computer 1930 may also be located on site in a field to provide faster feedback and guidance for the field operation. Such data, after conventional formatting and other initial processing, may be stored by the system computer 1930 as digital data in the disk storage 1931 or 1933 for subsequent retrieval and processing in the manner described above. While FIG. 19 illustrates the disk storage, e.g. 1931 as directly connected to the system computer 1930, it is also contemplated that the disk storage device may be accessible through a local area network or by remote access. Furthermore, while disk storage devices 1929, 1931 are illustrated as separate devices for storing input seismic data and analysis results, the disk storage devices 1929, 1931 may be implemented within a single disk drive (either together with or separately from program disk storage device 1933), or in any other conventional manner as will be fully understood by one of skill in the art having reference to this specification.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the invention. Accordingly, the protection sought herein is as set forth in the claims below.

We claim:

1. A method to predict tars and tar sands in petroleum exploration and production in a subsurface volume, comprising:
   building a viscoelastic property model of the subsurface volume based at least in part on rock behavior in the presence of tar;
   determining a probability distribution to predict the presence of tar in the subsurface volume;
   building a seismic elastic property model of the subsurface volume using seismic inversion; and
   processing the probability distribution and the seismic elastic property model in a computer to derive a lithology volume based at least in part on the probability distribution and the seismic elastic property model.

2. The method as in claim 1, wherein processing the probability distribution and the seismic elastic property model to derive the lithology volume comprises selectively identifying the presence of tar in the lithology volume.

3. The method as in claim 1, wherein the viscoelastic property model and the seismic elastic property model share common attributes, wherein at least one of the common attributes is selected from the group consisting of an acoustic impedance, a shear impedance, a Poisson's ratio, a density, a Vp velocity and a Vs velocity.

4. The method as in claim 1, wherein processing the seismic elastic property model and the probability distribution comprises applying a probability distribution function to at least one attribute of the seismic elastic property model.

5. The method as in claim 1, wherein processing the seismic elastic property model and the probability distribution comprises applying a Bayesian method.

6. The method as in claim 1, wherein building a viscoelastic property model of the subsurface volume comprises modeling at least one attribute selected from the group consisting of:
   a pressure,
   a temperature,
   a compaction analysis, and
   a basin deposition history.

7. The method as in claim 6 further comprising:
   determining a probability density function (pdf) of tar based at least in part on the modeling of the at least one attribute.

8. The method as in claim 1, wherein building a seismic elastic property model of the volume using seismic inversion comprises deriving at least one elastic attribute using simultaneous prestack seismic inversion.

9. The method as in claim 8, wherein the at least one elastic attribute comprises an attribute selected from the group consisting of: an acoustic impedance, a shear impedance, a Poisson's ratio, a density, a Vp velocity and a Vs velocity.

10. The method as in claim 8, further comprising deriving the lithology volume using the probability density function and the at least one elastic attribute.

11. The method as in claim 1, further comprising:
   regulating a drilling plan based at least in part on tar identified in the derived lithology volume.

12. The method as in claim 1, further comprising:
   regulating a drilling plan to selectively apply a tar-drilling mode based at least in part on tar identified in the derived lithology volume.

13. A computer readable storage medium comprising instructions that when executed by a computer cause the computer to:
   build a viscoelastic property model of a subsurface volume based at least in part on rock behavior in the presence of tar;
   determine a probability distribution to predict the presence of tar in the subsurface volume;
   build a seismic elastic property model of the subsurface volume using seismic inversion; and
   process the probability distribution and the seismic elastic property model to derive a lithology volume based at least in part on the probability distribution and the seismic elastic property model.

14. The computer readable medium as in claim 13, the storage medium storing instructions that when executed by the computer cause the computer to identify the presence of tar in the lithology volume.

15. The computer readable medium as in claim 13, wherein the viscoelastic property model and the seismic elastic property model share at least one common attribute selected from the group consisting of: an acoustic impedance, a shear impedance, Poisson's ratio, a density, a Vp velocity and a Vs velocity.

16. The computer readable medium as in claim 13, the storage medium storing instructions that when executed by the computer cause the computer to model at least one attribute selected from the group consisting of:
   a temperature,
   a pressure,
   a local lithology trend, and
   a basin deposition history.

17. The computer readable medium as in claim 13, the storage medium storing instructions that when executed by the computer cause the computer to determine a probability density function (pdf) based at least in part on the viscoelastic property model.

18. A system for petroleum exploration and production in a subsurface volume, comprising:
   a processor; and
   a computer readable media containing instructions that when executed by the processor cause the processor to:
   build a viscoelastic property model of the subsurface volume based at least in part on rock behavior in the presence of tar;

determine a probability distribution to predict the presence of tar in the subsurface volume;
build a seismic elastic property model of the volume using seismic inversion; and
process the probability distribution and the seismic elastic property model to derive a lithology volume based at least in part on the probability distribution and the seismic elastic property model.

19. The system as in claim 18, wherein the lithology volume identifies the presence of tar in the lithology volume.

20. The system as in claim 19, wherein the viscoelastic property model and the seismic elastic property model share at least one common attribute selected from the group consisting of an acoustic impedance, a shear impedance, Poisson's ratio, a density, a Vp velocity and a Vs velocity.

21. The system as in claim 18, wherein the processor is adapted to model the viscoelastic property of tar based at least in part on at least one attribute selected from the group consisting of:
a temperature;
a pressure;
a lithology trend, and
a basin deposition history.

22. The system as in claim 18, wherein the processor is adapted to:
determine a probability density function (pdf) of tar based at least in part on the viscoelastic property model.

* * * * *